US009841249B1

(12) United States Patent
Nicks et al.

(10) Patent No.: US 9,841,249 B1
(45) Date of Patent: Dec. 12, 2017

(54) FIREARM SAFETY DEVICE AND SYSTEM FOR UNIQUELY AND INDIVIDUALLY ENABLING FIREARM DISCHARGE

(71) Applicants: Travis Nicks, Alexandria, VA (US); Andrew Beau Shallcross, Tulsa, OK (US)

(72) Inventors: Travis Nicks, Alexandria, VA (US); Andrew Beau Shallcross, Tulsa, OK (US)

(73) Assignee: Ignis Kinetics, Inc., Tulsa, OK (US)

( * ) Notice: Subject to any disclaimer, the term of this patent is extended or adjusted under 35 U.S.C. 154(b) by 0 days.

(21) Appl. No.: 15/282,488

(22) Filed: Sep. 30, 2016

(51) Int. Cl.
*F41A 17/06* (2006.01)
*F42B 5/295* (2006.01)
*F41A 9/65* (2006.01)
*H02J 7/02* (2016.01)

(52) U.S. Cl.
CPC .............. *F41A 17/063* (2013.01); *F41A 9/65* (2013.01); *F41A 17/06* (2013.01); *F42B 5/295* (2013.01); *H02J 7/025* (2013.01)

(58) Field of Classification Search
CPC ........ F41A 17/06; F41A 17/063; F41A 17/64; F41A 9/65
See application file for complete search history.

(56) References Cited

U.S. PATENT DOCUMENTS

| 4,518,938 | A | * | 5/1985 | Bartholomaus | H01F 7/1607 335/255 |
| 4,996,787 | A | * | 3/1991 | Holcomb | F41C 27/00 42/106 |
| 5,062,232 | A | * | 11/1991 | Eppler | F41A 17/063 42/70.11 |
| 5,459,957 | A | * | 10/1995 | Winer | F41A 17/066 42/70.11 |
| 6,219,952 | B1 | | 4/2001 | Mossberg et al. | |
| 6,237,271 | B1 | * | 5/2001 | Kaminski | F41A 17/063 42/70.01 |
| 6,282,829 | B1 | | 9/2001 | Mossberg et al. | |
| 6,286,240 | B1 | * | 9/2001 | Collins | F41A 17/066 42/1.01 |
| 6,343,429 | B1 | | 2/2002 | Mossberg et al. | |
| 6,374,526 | B1 | * | 4/2002 | Mochak | F41A 17/24 42/70.08 |
| 6,408,905 | B1 | | 6/2002 | Lee | |
| 6,412,207 | B1 | | 7/2002 | Crye et al. | |
| 6,735,897 | B1 | * | 5/2004 | Schmitter | F41A 17/063 42/70.01 |
| 6,861,944 | B1 | * | 3/2005 | Hoepelman | A43B 3/0005 235/380 |

(Continued)

FOREIGN PATENT DOCUMENTS

DE 3825134 A1 * 1/1990 ......... F02M 51/0614

*Primary Examiner* — Benjamin P Lee (57) ABSTRACT

The present invention relates to smart gun technology, i.e., devices, systems, and methods, designed to ensure that the individual who is attempting to fire a weapon has been authorized to use the in-use weapon. In some embodiments, we disclose a firearm safety device having a spring-type, hammerless firing pin coupled to a logic circuit configured to uniquely identify an individual. Some embodiments employ RFID technology, which is much more reliable than most consumer-grade biometric identification mechanisms.

18 Claims, 5 Drawing Sheets

(56) References Cited

U.S. PATENT DOCUMENTS

| | | | |
|---|---|---|---|
| 6,941,692 B1* | 9/2005 | Krinke | F41A 17/02 42/70.08 |
| 7,096,619 B2 | 8/2006 | Jackson et al. | |
| 7,204,051 B2* | 4/2007 | Thomele | F41A 17/72 42/69.03 |
| 7,339,456 B1* | 3/2008 | Buckley | F41A 17/063 340/5.51 |
| 7,703,229 B2 | 4/2010 | Parhofer et al. | |
| 8,046,948 B2* | 11/2011 | Mauch | F41A 17/063 42/70.01 |
| 8,093,991 B2 | 1/2012 | Stevenson et al. | |
| 8,132,496 B2* | 3/2012 | Zukowski | F41A 17/66 42/70.01 |
| 8,205,372 B2* | 6/2012 | Anzeloni | F41A 17/063 42/70.01 |
| 8,549,780 B2 | 10/2013 | Emde et al. | |
| 8,756,850 B2 | 6/2014 | Dietel | |
| 8,966,797 B2 | 3/2015 | Carlson | |
| 8,966,803 B2 | 3/2015 | Dietel et al. | |
| 9,383,153 B2* | 7/2016 | Nebeker | F41A 17/56 |
| 2009/0053678 A1* | 2/2009 | Falkenhayn | F41A 33/00 434/16 |
| 2010/0281725 A1* | 11/2010 | Arbouw | F41A 9/62 42/1.02 |
| 2011/0067282 A1* | 3/2011 | August | F41A 17/063 42/1.03 |
| 2011/0219656 A1* | 9/2011 | McGarry | F41A 11/00 42/70.06 |
| 2014/0041705 A1* | 2/2014 | Kang | H01L 31/02168 136/206 |
| 2015/0233660 A1* | 8/2015 | Barton | F41A 17/08 89/27.12 |
| 2016/0146560 A1* | 5/2016 | Peterson | F41A 11/02 42/71.01 |
| 2016/0341506 A1* | 11/2016 | Steele | F41A 17/063 |
| 2017/0010062 A1* | 1/2017 | Black | F41A 17/063 |

* cited by examiner

FIREARM SAFETY DEVICE AND SYSTEM FOR UNIQUELY AND INDIVIDUALLY ENABLING FIREARM DISCHARGE

FIELD

The present invention relates generally to a firearm safety device and system for uniquely enabling gun use on an individual basis.

BACKGROUND

Firearm safety has been an issue almost as long as firearms have existed. In fact, the more ubiquitous firearms have become, the greater the need has been to balance the rights of the firearm owner with public safety concerns. There are many firearm casualties that could have been prevented if the gun owner utilized some sort of safety device. By way of example, common instances that could have been prevented are: (1) children finding a loaded firearm and accidentally discharging the weapon; (2) an intruder discovering a weapon and using it against the gun owner; (3) an altercation that results in the gun owner losing control of the firearm; or (4) suicide committed by someone other than the gun owner.

Irrespective of which side of the gun debate an individual is on, generally most people support the development of devices that prevent unauthorized use of firearms. Over the years, gun owners have used locks and safes as a means of ensuring that their guns will not accidentally be used by young children for example. See e.g., U.S. Pat. No. 3,512,290 and a more modern version at U.S. Pat. No. 7,908,779, the entire contents of both are hereby incorporated by reference.

In addition, there are electronic locks, such as pin code readers or motion detectors that have been employed as a firearm safety mechanism. See e.g., U.S. Pat. No. 5,459,957 (pin code) and U.S. Pat. No. 7,096,619 (motion detection), the entire contents of which are hereby incorporated by reference. While these electronic locks eliminate the need to find a key and unlock a mechanical lock, they can be equally impractical in an emergency situation where it may be dark and the user may be under duress because he or she may be in imminent danger.

The above-described safety mechanisms, therefore, suffer from the time lag required for the gun owner to access his/her gun in the event an intruder enters his/her home. To address this shortcoming, innovators have developed a number of alternative electromechanical solutions to the gun safety issue. For example, some firearm safety devices employ biometric authentication, such as a fingerprint authorization, voice recognition, DNA recognition, and optical recognition before becoming operational. See U.S. Pat. No. 8,756,850, the entire contents of which are hereby incorporated by reference. Although each of these biometric data are a fairly reliable means of identifying an individual, the authentication process is implemented in hardware and software. There is a direct correlation between the accuracy of these recognition devices and the cost and sophistication of the hardware and software. For most civilian applications, the hardware/software available to use biometric detection as a means of authentication will inherently have a certain percent of false positive or false negative readings. False positive and false negative authentications for a firearm safety device can have deadly consequences for the user.

Another solution to the spontaneity impediments of locks and safes is the use of transponders, radio frequency identification ("RFID") and other electronic authorization means within a wearable, such as a ring or a watch, paired with a particular firearm. When the wearable is within close proximity to the firearm, the firearm can be fired. The corollary being, when the wearable is out of range of the firearm, the firearm is disabled. See e.g., U.S. Pat. No. 8,549,780, the entire contents of which are hereby incorporated by reference. While this is an improvement over the false positives and false negatives that are inherent in biometric detection, there is nonetheless a risk that the user would not be wearing his/her watch at the exact moment when he/she needed to use the firearm.

Alternative approaches to firearm safety have included the concept of disabling the firearm if it is within a certain range of a particular type of public building, for example a school, airport, or church. U.S. Pat. No. 8,966,797, the entire contents of which are hereby incorporated by reference, for example discloses the idea of using GPS tracking to determine if the firearm is within a certain range of a protected building or space. When the firearm comes within that range, it is automatically disabled. The GPS tracking capability is enabled by a phone communicatively coupled to the firearm, or internally within the firearm in additional embodiments.

This patent proposes potentially valuable public safety technology. It provides an easy, reliable means for ensuring that the proper owner of the firearm, and any additionally authorized users, are the only individuals who can operate a specific firearm. The issues related to firearm safety have become so prevalent in modern society, even law enforcement agencies are discussing the need to provide additional safety measures in guns used by law enforcement personnel. Specifically, the National Institute of Justice recently released a set of guidelines entitled "Draft Baseline Specifications for Law Enforcement Service Pistols with Security Technology" for public comments, the entire contents of which are hereby incorporated by reference. See http://nij.gov/Documents/draft-baseline-specifications-for-law-enforcement-service-pistols-with-security-technology.pdf. Of note, these guidelines call for integrating smart gun technology into a firearm's design without compromising the reliability, durability, and accuracy officer's expect from their weapons.

There is thus a need in the firearm safety industry for a means of ensuring that there is a one-to-one or one-to-few pairing of a gun with an authorized user or users.

SUMMARY OF THE INVENTION

The present invention relates to smart gun technology, i.e., devices, systems, and methods, designed to ensure that the individual who is attempting to fire a weapon has been authorized to use the in-use weapon. In some embodiments, we disclose a firearm safety device having a spring-type, hammerless firing pin coupled to a logic circuit configured to uniquely identify an individual. Some embodiments employ RFID technology, which is much more reliable than most consumer-grade biometric identification mechanisms.

In some embodiments, the RFID chip that is used to pair the individual seeking to fire the weapon with the weapon itself could be implanted within the individual, or could be embedded within wearable, such as a ring, bracelet, fake fingernail, body art, tattoo, watch, and the like. The exterior of the firearm, in some embodiments, could be comprised of a malleable solar panel used to provide battery power to the smart technologies disclosed herein.

Embodiments of the smart technology include using RFID authentication in bullets or within the magazines encasing bullets. The magazine embodiments disclosed herein can be charged wirelessly and can be used as a sole source of batter power, or a supplemental source of battery power, for firearms enabled with these embodiments.

List of Reference Numerals

| Reference Number | Description |
| --- | --- |
| 8 | Frame |
| 10 | Handle |
| 12 | Barrel |
| 14 | Trigger |
| 16 | Notch |
| 17 | Switch |
| 18 | antenna for logic circuit |
| 19 | safety lever |
| 20 | firing pin |
| 22 | first cavity |
| 23 | launch spring |
| 24 | second cavity |
| 25 | magnetically permeable control arm |
| 26 | lock head |
| 27 | compression spring |
| 28 | solenoid actuator |
| 29 | anchor point |
| 30 | lock release logic circuit |
| 34 | compressing arm |
| 38 | battery connector |
| 50 | insertion mechanism |
| 51 | pressurized injector |
| 52 | RFID chip |
| 53 | Sponge |
| 54 | injector tip |
| 55 | pressurized tube |
| 56 | biological sealant |
| 57 | tip guide |
| 58 | Spring |
| 60 | Magazine |
| 62 | battery connector |
| 64 | inductive charger |
| 66 | battery bank |
| 70 | charging pad |

DETAILED DESCRIPTION

Throughout this specification, the inventors propose several safety mechanisms that can be used either individually or in conjunction with one another to further enhance firearm safety by reducing the likelihood that an unauthorized individual will have the ability to discharge a firearm 8 equipped with any of the foregoing features. The first of these safety mechanisms is a locking mechanism that sits between a lock release logic circuit 30 and an elongated cylindrical firing pin 20 having a striker tip This safety mechanism ensures that unauthorized personnel could not fire a weapon equipped with the safety features disclosed herein. As the number of civilian firearms owners increases, so too do the number of preventable deaths. The embodiments of the present invention seek to minimize preventable deaths such as, and without limitation, children discovering a loaded weapon and accidentally discharging the weapon, individuals using another person's weapon to commit crimes or suicide, an individual overpowering an armed individual during a confrontation and assuming control of the armed person's weapon, and so on. The embodiments disclosed herein seek to revolutionize firearms by ensuring that no unauthorized person can fire a gun. The intent is to ensure that the people who can own firearms are the people who get to fire them. Consequently, the people who do not own a firearm would not be able to fire it, regardless of whether or not they possess it.

Figure 1:
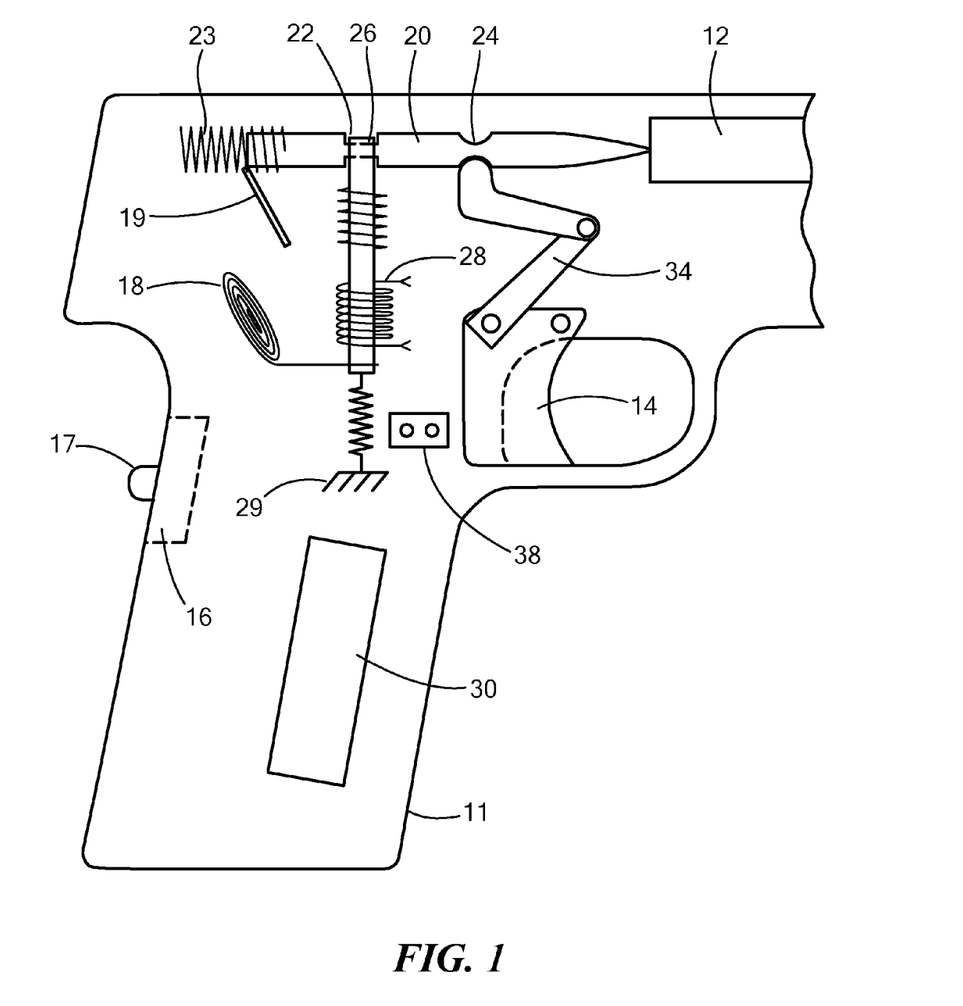
FIG. 1 is a side cut-away view of an exemplary embodiment of the firearm safety device and system.

FIG. 1 shows a portion of the interior components used in an exemplary embodiment. In this embodiment, the is a portion of a firearm frame 8 having a handle 10, a barrel 12, and a trigger 14. The handle 10, barrel 12, and trigger work in the traditional way those if skill in the art would expect. In some pistol embodiments, the frame 8 has a length of less than 9 inches, a height of less than 6 inches, a width of 1.35 inches or less, and a weight including all additional components excluding ammunition of less than 42 ounces. In some embodiments, the barrel 12 could be of a length to accommodate concealed and open carry requirements within the various states, e.g., approximately 3.75to 5.20 inches. In some pistol embodiments, the barrel 12 is positioned at a bore axis height of less than 1.75 inches, is rifled to a twist rate of at least 1 revolution to 12 inches, and has a diameter to accommodate a specific caliber, to include 9mm Luger and .40 Smith and Wesson ammunition. The safety devices described in embodiments herein will work in a variety of firearms including a pistol, rifle, or other type of long gun. Additionally, the frame 8 used to house the inventive safety mechanisms could be comprised of an electrically permeable material.

The rear of the handle 10 has a notch 16, which in turn has a waterproof mechanical-electrical style switch 17 located therein. In some embodiments, the lock release logic circuit 30 could be coupled to an antenna 18 suitable for reading identification information from a remote source, such as a radio frequency identification chip located in or on a human being. In this instance, it would be beneficial for the lock release logic circuit 30 to be communicatively coupled to an antenna 18 that is capable of transmitting and receiving identifying information wirelessly.

The interior of the frame 8 could include at least two voids or compartments, one suitable for housing a locking mechanism and the other suited for housing a lock release logic circuit 30.

Referring to FIG. 1, the firing pin 20 is proximal to a launch spring 23 on one end and a bullet (not shown), which is itself positioned to be fired out of the barrel 12, on the other end. More specifically, the striker tip is proximal to a small penetrable opening within the barrel that allows the striker, also called impact, tip portion of the firing pin 23 to come into contact with the striking portion of the bullet when the locking mechanism has authorized the user to fire the gun.

Those of skill in the art will recognize that the action depicted in FIG. 1 is a spring type, hammerless firing pin 23. The firing pin 23 is an elongated cylindrical firing pin, with a conical impact tip. The firing pin 23 has a first cavity 22 removed from it to allow a holding space for a lock head 26. In this embodiment, the first cavity 22 is a toroid. In alternate embodiments, the first cavity 22 could be cylindrical, cubical, conical, spherical, a prism (rectangular or triangular), or a pyramid.

A launch spring 23 surrounds the portion of the firing pin 20 after the first cavity 22. In the non-firing state, the launch spring 23 is held in light compression. As the trigger 14 is pulled, the firing pin 20, when in the unlocked position, will further compress the launch spring 23 via the compressing arm 34 until a safety lever 19 slips. The compressing arm 34 is mechanically coupled to a second cavity 24 within the firing pin 20. If the firing pin 20 is unlocked, then as the trigger 14 is pulled it moves the compressing arm 34, which releases the firing pin 20, thus releasing it to its stored spring force and striking the bullet primer. The launch spring 23 will then release its compressed energy by elongating and propelling the firing pin 20 into a striking portion of the bullet.

As previously stated, the locking mechanism is configured to mechanically couple to a first cavity 22 when the firearm is not in use. Once an individual pulls the trigger 14, the safety mechanisms disclosed herein initiate an authentication sequence in order to determine if the individual pulling the trigger 14 is authorized to use the particular firearm in question. This authentication sequence is performed primarily by the lock release logic circuitry 30.

The lock release logic circuitry 30 is powered by a power source, for example a battery that could be plugged into the battery connector 38. The battery could be a rechargeable battery that could be charged via an alternating current induction charger or in some embodiments via malleable solar panels formed into the frame 8. In system embodiments, there is provided a charging pad 70 and a holster (not pictured), as shown in FIG. 5, which can be used to charge the firearm.

Figure 5:
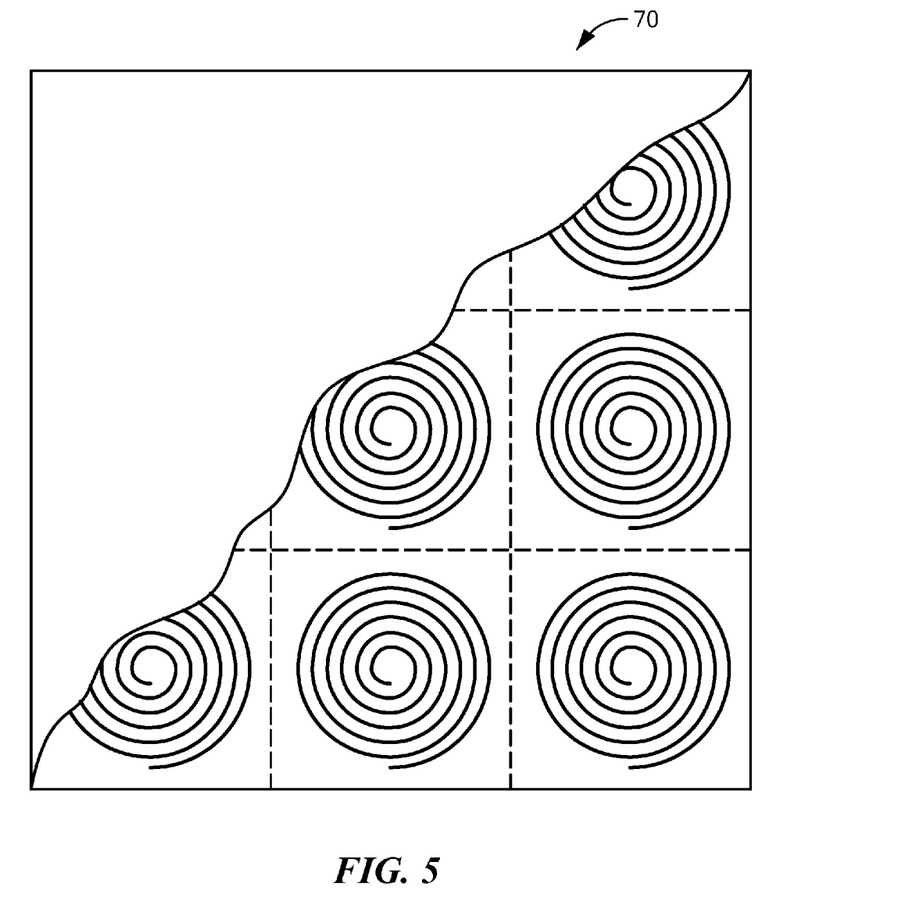
FIG. 5 is a top cut-away view of an exemplary charging pad.

FIG. 5 depicts a charging pad 70 comprised of nine (9) copper wire coils used to create a charging field. The charging pad 70 can be covered with a magnetically permeable cover, e.g., rubber, leather, and the like, which is not shown, but would be an obvious addition to those of skill in the art. The charging pad 70 could also have an outlet that allows it to be plugged into a power source such as electrical A/C current. Additionally, the charging pad 70 could have control circuitry such as over-current, over-temperature, power distribution circuitry, fuses and the like.

In some embodiments, the lock release logic circuitry 30 could be a radio frequency identification ("RFID") detector and reader. The reader could be comprised of a mechanical switch 17, an antenna 18, and a reader, a processor, and an electronic switch, which would be part of the lock release logic circuitry 30.

The mechanical switch 17 could be located at the rear of the pistol handle 10. When an individual's hand squeezes the handle 10, the rear portion could compress like a lever on a rocker hinge. The compressed lever depresses the mechanical switch 17, which then energizes the remaining portions of the RFID reader found in the lock release logic circuit 30. In order to conserve battery power, these embodiments are configured to remain in a low power state unless the mechanical switch 17 is depressed, which in turn would energize the RFID reader circuitry found in the lock release logic circuit 30.

The antenna 18 assembly both transmits a RFID chip detection frequency and receives returned RFID signals. The antenna 18 emits its detection frequency when energized and passes received frequencies to the RFID reader, found in the lock release logic circuit 30, for signal processing.

The RFID reader, found in the lock release logic circuit 30, receives incoming RFID signals from the antenna 18. The incoming signal passes through a series of signal filters, which remove interfering signals, strip the carrier signal, and retain and refine the reflected RFID signal. The refined reflected RFID signal is digitally converted for signal matching. The signal matching portion uses an if-then logic gate, which is located in the lock release logic circuit 30. If the received RFID frequency matches the pre-tuned frequency paired between the firearm owner or authorized user and firearm, an electric switch, which is also contained within the lock release logic circuit 30, closes. When the electric switch closes, it sends a current to a solenoid actuator 28, which ultimately results in unlocking the firing pin 20.

Figure 2:
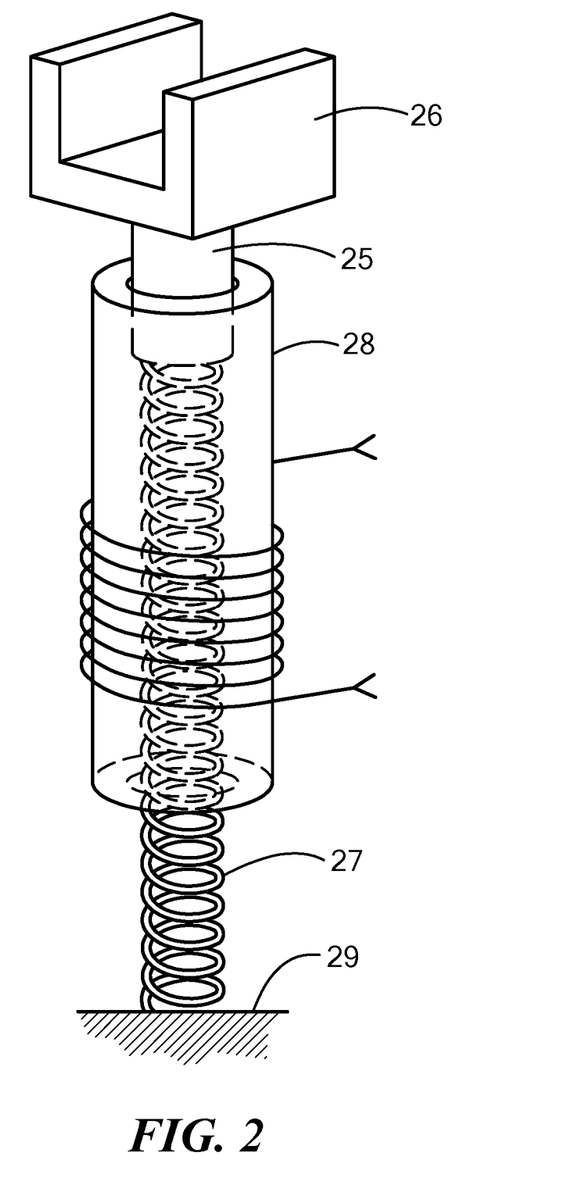
FIG. 2 is a perspective view of the locking mechanism of an exemplary embodiment of the firearm safety device and system.

FIG. 2 is a perspective view of an embodiment of the locking mechanism. This embodiment is comprised of a lock head 26, a magnetically permeable control arm 25, a compression spring 27, and a solenoid actuator 28, attached to an anchor point 29. In alternate embodiments, the lock head 26 could be a two pronged fork shaped lock head or a single deadbolt type lock head. Either geometry could be attached to a magnetically permeable control arm 25, which is itself attached to a compression spring 27. The compression spring 27 pushes the magnetically permeable control arm 25, and therefore the lock head 26, into a locked position within the first cavity locking mechanism 22. In one embodiment, the first cavity 22 could be a toroid cutaway. In an alternate embodiment, the first cavity 22 could contain a center bored hole.

Irrespective of these geometries, a portion of the magnetically permeable control arm 25 stays inside of the solenoid actuator 28 in order to reduce the required Lorentz force to overcome the compression spring 27 and unlock the gun. The reason less force is needed is that the electric field generated by the solenoid actuator 28 dissipates exponentially as the control arm 25 gets further from the solenoid actuator 28. Leaving part of the control arm 25 in the solenoid actuator 28 means there is part of the control arm 25 for the magnetic force to "grab" on to, to pull it down into the solenoid actuator 28.

In embodiments, the solenoid actuator 28 can be coated in an electric field concentrating rubberized coating with a low friction inner plastic tube. The electric field rubberized coating could be a plastic coating with ferrous dust to concentrate the magnetic field, thereby reducing losses and maximizing Lorentz force generation. Providing an inner low-friction cylinder ensures smooth operation of the magnetically permeable control arm 25 during its stroke through the solenoid actuator 28. As the solenoid actuator 28 is energized, the electromagnetic force generated by the electric field will act on the magnetically permeable control arm 25, pulling into the center of the solenoid actuator 28. When the electromagnetic force overcomes the spring force of the compression spring 27, the magnetically permeable control arm 25 will be retracted into the solenoid actuator 28 thereby retracting the lock head 26 from the first cavity 22. The result is, the firing pin 20 will be unlocked and the firearm will be capable of releasing the firing pin to discharge a bullet.

In embodiments herein, the locking mechanism could be between approximately 0.2 inches and 0.4 inches. The interior diameter of the solenoid actuator 28 could be less than about 0.25 inches. The control arm 25 and the lock head 25 could be less than about 0.15 inches.

In terms of user recognition, some embodiments utilize subtle RFID chip technology as a means of authorizing firearm operators. In these embodiments, a specific individual is unequivocally given permission to operate a firearm by virtue of an RFID chip located within or on the individual so that the lock release logic circuit 30 can verify that the individual has been authorized to fire the particular firearm in question. This type of authorization is far superior to fingerprint authorization because it works when an individual is seeking to fire with a single hand, left or right, both hands, or when wearing gloves. In addition, using RFID recognition technology exceeds the reliability provided by fingerprint recognition or other biometric recognition because RFID recognition is not susceptible to false positives/false negatives resulting from moisture, weather, skin condition, and the like.

Users of the smart gun technology disclosed herein would be given the option to use an implanted RFID chip, an external RFID chip, or both as a means of identifying themselves to the lock release logic circuitry 30 in order to enable weapon discharge. In the case of external RFID chip technology, a user could wear an RFID chip in a bracelet, ring, watch, fake fingernail, embedded as body art, or part of a tattoo, and the like. See e.g., the contents of which are hereby incorporated by reference, http://www.gizmodo.com.au/2016/07/fake-fingernails-with-embedded-rfid-travel-card-are-literally-tap-and-go/ for an example of an RFID chip embedded within a fake fingernail.

FIG. 6 shows some of the wearable technology a user could employ when using the firearm safety systems described herein. In one embodiment, users can wear a bracelet comprised of an antenna and three (3) equidistant, identical chip and capacitor beads. The bracelet would be a circular bracelet comprised of a waterproofed tube surrounded by a protective fiber sleeve. Within the tube is the RFID wearable antenna. Distributed equilaterally are three chip-and-tuning capacitor beads. This geometric distribution ensures that the RFID will continue to function as intended regardless of the orientation of the bracelet. In this embodiment, when the bracelet rotates around the wrist, the device is still capable of effectively coupling with the lock release logic circuit 30 to enable firing of the firearm.

In an additional embodiment, the RFID chip could be embedded within a thin hollow ring comprised of an electrically permeable composite material and a decorative outer film. The cross-section of the ring could be horseshoe shaped. An internal cavity could include an antenna wrapped around the internal perimeter of the ring. The RFID chip and a capacitor could also be included internally within the ring.

In an alternate embodiment, the RFID chip technology that communicatively couples to the lock release logic circuit 30 could be a thin, plastic fingernail that is capable of being attached onto an existing fingernail. Alternatively, the RFID chip technology could be embedded within a glove. In either of these embodiments, there would also be a coiled antenna, a silicon chip, and a tuning capacitor.

Figure 3:
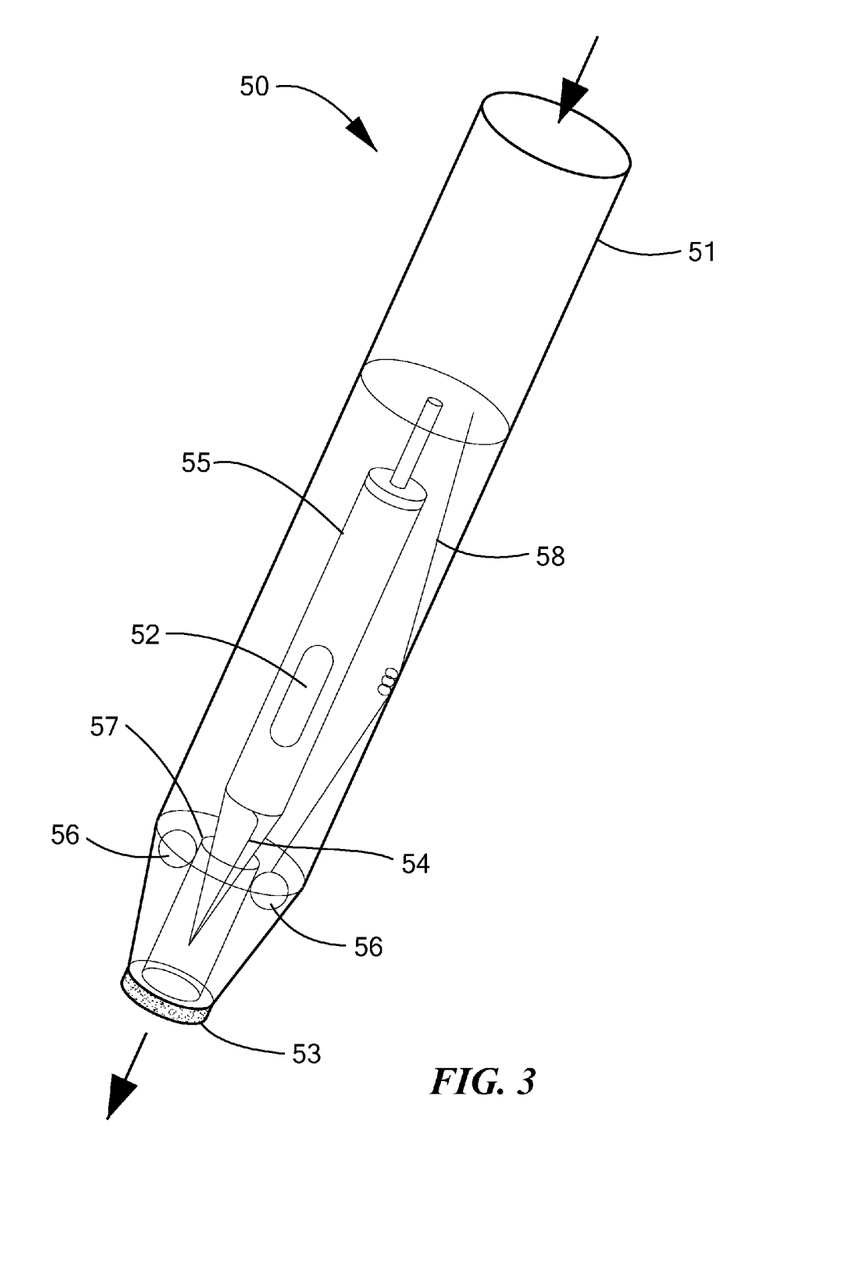
FIG. 3 is a perspective view of an implantable RFID chip system for use in firearm safety system embodiments.

In alternate embodiments where users desire to implant an RFID chip or similar technology internal to themselves, we provide a subtle RFID chip and insertion mechanism 50 as shown in FIG. 3. The insertion mechanism 50 is designed to implant a subtle RFID chip 52 into a human. Our design could be used at home and without the assistance of a medical professional. The insertion mechanism 50 is comprised of a pen-sized pressurized injector 51. The pressure injector 51 is comprised of a sponge 53, an injector tip 54, a pressurized tube 55, a biological sealant 56, a tip guide 57, and a spring 58. The insertion mechanism 50 can be held in an individual's hand between the thumb and forefinger. When the insertion mechanism 50 is activated, either by depressing a lever, pushing a button, or similar mechanical means, the injector tip 54 moves downward toward the individual's skin. The injector tip 54 breaks the tip guide 57, which in turn exposes the biological sealant 56, which could be encapsulated in some embodiments and could be biological superglue gel balls in yet additional embodiments. The biological sealant 56 pours downward into the sponge 53 where it will seal the puncture wound exacted by the injector tip 54. The pressurized tube 55 could also contain lubricant or disinfectant to facilitate safe, sanitary insertion of the RFID chip 52. The spring 58 facilitates retraction of the injector tip 54 after an RFID chip 52 has been inserted.

The subtle RFID chip 52 can be matched with a pistol, or series of pistols/weapons. An authorized user (or users) who carries the correct RFID will be able to unlock the pistol. In some embodiments, the RFID chip 52 is either applied to a sticker with a strong adhesive, or is injected into the skin of the hand between the thumb and forefinger. The sticker type RFID tag 52 has a truncated antenna. In addition, the implantable RFID chip 52 could have a cocoon-like antenna, which would also reduce the size of the RFID chip 52 by as much as 35% in some embodiments.

This shortened antenna distinguishes it from other sticker type RFID tags. The bulk of the planar size of existing RFID chips is the antenna. If the antenna is shortened then the effective range of the RFID chip 52 is reduced, which is suitable in present embodiments because it means the weapon can only be fired by the authorized user when the user is holding the grip 10 of the firearm. If the user is not holding the grip 10 of the firearm, he or she will be too far out of range for the lock release logic circuit 30 to authorize firing of the weapon. Of note, these embodiments do not alter the normal grasping and firing of the weapon.

Figure 4A:
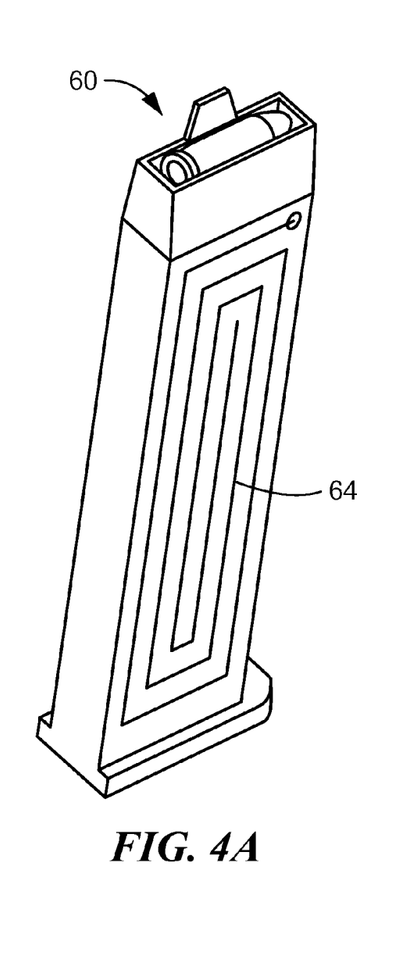
FIG. 4A is a right side perspective view of an exemplary magazine for use in firearm safety device and system embodiments.

FIG. 4A is a right-side perspective view of an exemplary magazine 60 for use in firearm safety device and system embodiments. The magazine 60 disclosed herein provides energy storage to supply power to the electrical and electromechanical portions of the weapon in an easy to install, easy to recharge, user-friendly way. The magazine 60 can be charged myriad ways including wired and wireless charging. The wireless charging could be accomplished by placing the magazine 60 on a wireless induction charging pad. In addition, the magazine 60 could be charged via power collected and/or stored by solar collection material coating firearms enabled with the smart technology disclosed herein.

In alternate embodiments, the magazine 60 could be charged via a holster. In these embodiments, a charging coil could be integrated into a weapon holster. The wall of the holster houses the induction coil charger. The charger receives its electrical power from a battery strip located on the inner-most part of the holster. This battery bank is rechargeable and uses the same induction coil to recharge itself in the presence of another induction charger by simply flipping a switch in the battery bank that directs current flow in or out. The holster itself can be charged on a charging pad 70.

In embodiments disclosed herein, the power stored within the firearm for operating the safety mechanisms disclosed could be used only when an individual grasps the handle 10 of the firearm, thereby depressing switch 17. In embodiments disclosed herein, there could be a battery internal to the firearm as well as a battery within the magazine 60. For embodiments containing battery power within the magazine 60, the magazine housing could include a male connector 62 configured to couple to battery connector 38.

Figure 4B:
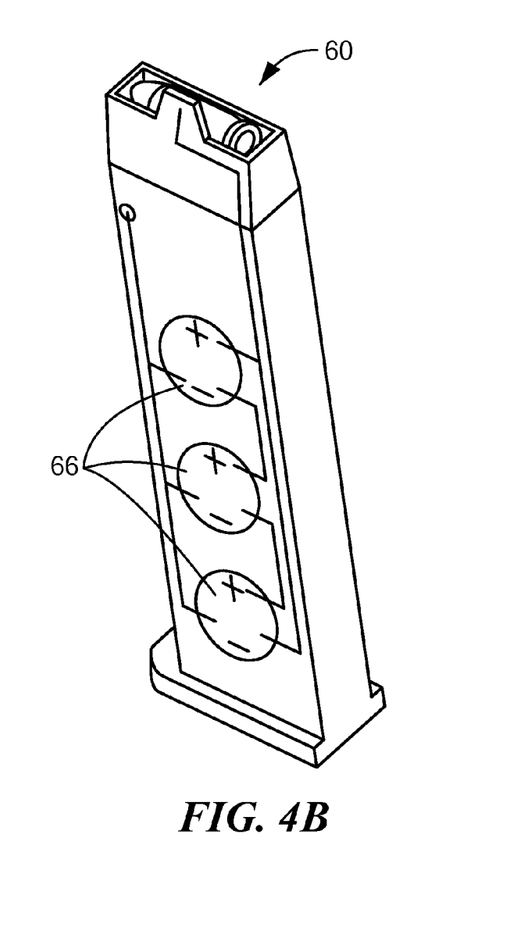
FIG. 4B is a left side perspective view of an exemplary magazine for use in firearm safety device and system embodiments.

The magazine 60 is a traditional magazine style with substantial modifications. It retains the angled rhombus box shape and holds appropriate caliber bullets in a feeding position for semi-automatic reloading by use of a compressed spring. The external part of the magazine 60 is distinct from existing models. Each magazine is comprised of four components: a housing and bullet feeding system, a magazine catch released at 4-7 pounds of pressure, a battery bank 66, and a wireless induction charging system 64. The battery bank 66 and charger 64 are encased in a waterproof, electrically permeable film. The battery bank 66 is rechargeable and replaceable. In addition, the firearm can include an indicator, such as a covert LED coupled to a power meter, which is in turn coupled to the batter bank 66, designed to provide the user with an indication as to battery power, in particular if the battery power is below a predetermined threshold.

At the top of the magazine is a hardened male-end connector 62. As the magazine is inserted and "clicked" in to place on the magazine catch, the male-end connector 62 electrically couples to the female-end receiver 38 embedded in the structure of the pistol. This coupling allows for the power of the detection and locking systems via batteries 66 on the magazine 60.

The battery bank 66 is a series of small, thin disc type batteries. These batteries 66 are encased in a thin, waterproofing film. They are directly connected to the lock release logic circuit 30 via the connection between the male and female couplers 62, 38 and to the wireless induction charger 64. A replaceable battery stored inside the grip handle is included in electrical parallel with the magazine battery.

The wireless induction charger 64 is a series of flattened coils of conductive wire that will induce a current in the presence of an electric field. The charger is flat against the magazine 60 and is coated with a thin, waterproof film. As a current is induced in the charging coil, the charger 64 will automatically recharge the battery bank 66.

In some embodiments, the magazine 60 could be filled with proprietary bullets. Some of these bullets could be designed, for example, to not penetrate multiple walls, for example by limiting the grain count within the bullet, thereby reducing the likelihood that a shooter will shoot past an intruder and into a nearby room in which another person resides putting them in harm's way. In additional embodiments, there could be a bullet that disintegrates into small shrapnel after firing, essentially turning the bullet into a shotgun shell with limited penetrating ability.

In these embodiments, the bullet could be constructed of a soft material inside of a harder exterior shell that melts as a result of the high temperature explosion internal to the barrel. This bullet would spray metal shrapnel in a small area by using the rifling characteristics of the barrel to spin the soft internal metal while the outer shell melted. This would be particularly effective if just trying to shoot to hurt instead of kill, and would dramatically reduce the penetrating ability of the round There could be bullets that individually identify the gun from which they were shot. This could also allow third party assessors to determine which round came from which person, as in detectives or shootings involving multiple law enforcement members. In some of these embodiments, the bullets themselves could also have RFID chips located therewithin. In these embodiments, it could be possible to communicatively link the bullets to the lock release logic circuit 30 thereby adding an additional layer of safety by requiring that the bullets and the shooter both be pre-authorized and registered with the particular firearm being used.

In some embodiments there could be tracking technology that would allow a user to receive accuracy feedback, for example if training to use a weapon. In these embodiments, the casing around the primer would be thermally shielded from the internal explosion by a thermal barrier material. The outer, shielded portion of the casing around the primer would be the location of the silicone RFID chip and the tuning capacitor. The antenna would wrap around this region by going around the circumference of the casing. These embodiments could be comprised of a hardened, electrically permeable (metal) bullet. Inside the bullet is an RFID chip. Each round would have a slightly different RFID enabled serial number thereby allowing the shooter to determine which shot the bullet came from. This would have to be paired with an internal bullet RFID reader and a gyroscope to show the movement of the weapon that caused the variance in a shot. It would show a shooter how they moved the weapon that caused a final result with respect to accuracy.

Although the smart gun technology described herein is designed to work with any number of firearms, e.g., pistols, long guns, semi-automatics, and the like, some embodiments are specifically tailored to the needs of law enforcement officers. For example, the lock release logic circuit 30 is capable of being programmed to allow more than one operator to fire the firearm. Similarly, firearms equipped with embodiments described herein will as reliable as firearms of the same design that are not equipped with the disclosed security devices.

Embodiments disclosed herein will not increase the time required by the operator to grasp, remove from a holster, and fire a pistol containing the disclosed smart gun technology as compared with a pistol of the same design that is not equipped with the disclosed security devices.

The smart gun technology disclosed herein does not emit audible sounds or non- covert visible signals during use.

In some embodiments, the lock release logic circuit 30 could be adjustable so that it defaults to a state of allowing the firearm to discharge in the event of an equipment failure.

Those of skill in the art will recognize throughout this specification that when like terms are used to describe features and functionalities of various portions of a particular embodiment, those same features and functionalities could be present in additional embodiments having aspects with like terms.

The articles "a" and "an" as used herein in the specification and in the claims, unless clearly indicated to the contrary, should be understood to include the plural referents. Claims or descriptions that include "or" between one or more members of a group are considered satisfied if one, more than one, or all of the group members are present in, employed in, or otherwise relevant to a given product or process unless indicated to the contrary or otherwise evident from the context.

The invention includes embodiments in which exactly one member of the group is present in, employed in, or otherwise relevant to a given product or process. The invention also includes embodiments in which more than one or the entire group of members is present in, employed in or otherwise relevant to a given product or process. Furthermore, it is to be understood that the invention encompasses all variations, combinations, and permutations in which one or more limitations, elements, clauses, descriptive terms, etc., from one or more of the listed claims is introduced into another claim dependent on the same base claim (or, as relevant, any other claim) unless otherwise indicated or unless it would be evident to one of ordinary skill in the art that a contradiction or inconsistency would arise.

Where elements are presented as lists, (e.g., in Markush group or similar format) it is to be understood that each subgroup of the elements is also disclosed, and any element(s) can be removed from the group. It should be understood that, in general, where the invention, or aspects of the invention, is/are referred to as comprising particular elements, features, etc., certain embodiments of the invention or aspects of the invention consist, or consist essentially of, such elements, features, etc. For purposes of simplicity those embodiments have not in every case been specifically set forth in so many words herein. It should also be understood that any embodiment or aspect of the invention can be explicitly excluded from the claims, regardless of whether the specific exclusion is recited in the specification. The entire contents of all of the references (including literature references, issued patents and published patent applications and websites) cited throughout this application are hereby expressly incorporated by reference.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification, embodiments have been described in a way which enables a clear and concise specification to be written, but it is intended and will be appreciated, that embodiments may be variously combined or separated without departing from the invention. It is intended that the present invention be limited only to the extent required by the appended claims and the applicable rules of law.

What is claimed is:

1. A firearm safety device comprising:
    a. a gun frame having a handle, a barrel, and a trigger;
    b. an elongated cylindrical firing pin having an impact tip;
    c. a lock release logic circuit; and
    d. a locking mechanism; wherein:
        i. the elongated cylindrical firing pin further comprises a first cavity configured to receive a fork-style lock head, a spring mechanically coupled to the firing pin, and a second cavity mechanically coupled to a trigger, which is in turn mechanically coupled to a compressing arm;
        ii. the locking mechanism further comprises the fork-style lock head mechanically coupled to a compression spring mechanically coupled to an anchor point and a solenoid actuator; and
        iii. the locking mechanism is communicatively coupled to the lock release logic circuit.

2. The firearm safety device of claim 1 wherein the lock head is mechanically coupled to a control arm comprised of a magnetically permeable material.

3. The firearm safety device of claim 1 wherein an exterior of the solenoid actuator is comprised of an electric field concentrating coating used for shaping the electromagnetic field of the solenoid.

4. The firearm safety device of claim 1 wherein the gun frame is electrically permeable.

5. The firearm safety device of claim 1 wherein the handle is configured to receive a magazine, the magazine further comprising a housing, a bullet feeding system, a battery bank, and a wireless induction charger.

6. The firearm safety device of 5 wherein the battery bank and the wireless induction charger are encased within a waterproof, electrically permeable film.

7. The firearm safety device of claim 5 wherein the magazine further comprises a first connector configured to electro-mechanically couple to second connector inside of the gun frame.

8. The firearm safety device of claim 5 wherein the magazine is further comprised of at least one bullet having a passive radio frequency identification device on a casing of the at least one bullet.

9. The firearm safety device of claim 1 wherein the gun frame is further comprised of a removable battery bank configured to attach to the handle of the gun frame.

10. The firearm safety device of claim 1 wherein the lock release logic circuit is further comprised of a radio frequency identification detector and a radio frequency identification reader.

11. A method for securing a firearm particularly for operating a safety device according to claim 1 comprising the following steps:
    a. Providing the safety device in the firearm; and
    b. Prohibiting the firing of the firearm unless an authentication signal has been received within the firearm.

12. The firearm safety device of claim 1 wherein the solenoid actuator is a direct current solenoid actuator.

13. The firearm safety device of claim 1 wherein a compression spring force maintains the firing pin in a locked position unless an authentication of a user is made within the lock release logic circuit, thereby energizing the solenoid actuator sufficiently to overcome the compression spirng force thereby unlocking the firing pin.

14. The fireman of claim 1 wherien the firing pin remains locked unless an authentication of a user is made within the lock release logic circuit.

15. A firearm safety system comprising:
    a. A firearm safety device according to claim 1, and
    b. A radio frequency identification chip.

16. The firearm safety system of claim 15 further comprising two additional radio frequency identification chips wherein the three radio frequency identification chips are housed within a bracelet.

17. The firearm safety system of claim 15 wherein the radio frequency identification chip is configured to be attached to a fingernail.

18. The firearm safety system of claim 17 further comprising a wireless charging device.

* * * * *